(No Model.) 2 Sheets—Sheet 1.

H. ARMSTRONG.
TOE WEIGHT FOR HORSES.

No. 457,502. Patented Aug. 11, 1891.

Witnesses

Inventor
Harry Armstrong
By his Attorney F. S. Davenport (No Model.) 2 Sheets—Sheet 2.

H. ARMSTRONG.
TOE WEIGHT FOR HORSES.

No. 457,502. Patented Aug. 11, 1891.

Witnesses.
R. Newton.
H. D. Stelle.

Inventor.
Harry Armstrong.
By his Attorney F. S. Davenport.

UNITED STATES PATENT OFFICE.

HARRY ARMSTRONG, OF FIDELITY, ILLINOIS.

TOE-WEIGHT FOR HORSES.

SPECIFICATION forming part of Letters Patent No. 457,502, dated August 11, 1891.

Application filed March 12, 1891. Serial No. 384,831. (No model.)

*To all whom it may concern:*

Be it known that I, HARRY ARMSTRONG, of Fidelity, in the county of Jersey and State of Illinois, have invented a new and useful Improvement in Toe-Weights for Horses; and I do hereby declare that the following is a full and exact description of the same, reference being had to the accompanying drawings, and to the letters of reference marked thereon.

My invention relates to an improvement in toe-weights for horses.

My object is to provide a toe-weight of more simple construction and of fewer parts than those heretofore in use, and also adapted to be firmly secured to the fore part of the hoof without pinching the latter to a degree hurtful to the horse or damaging to his gait, and, further, a toe-weight that can be attached to the hoof in a few moments and as expeditiously removed. The details of the contrivance by which I accomplish these ends are fully explained in the following specification, and illustrated in the accompanying drawings, in which—

Figure 1:
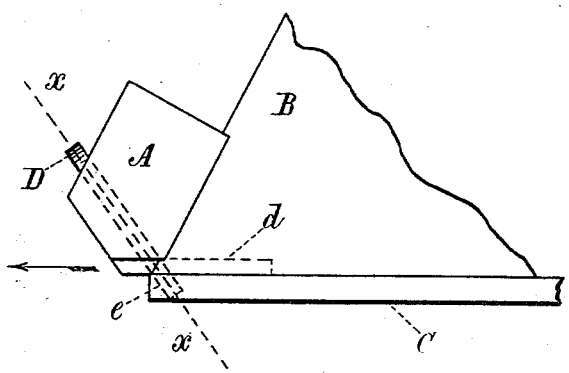
Figure 2:
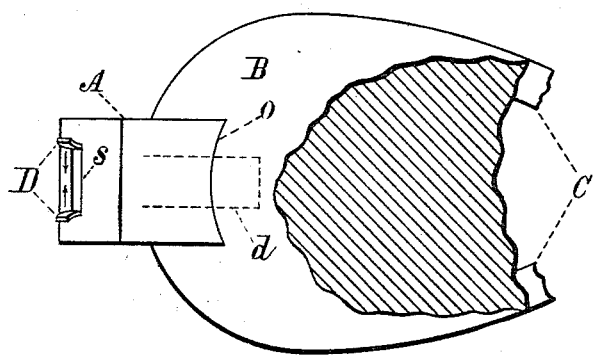
Figure 3:
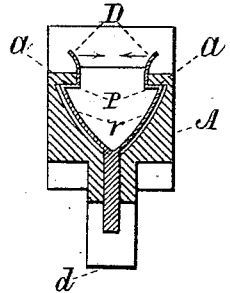
Figure 4:
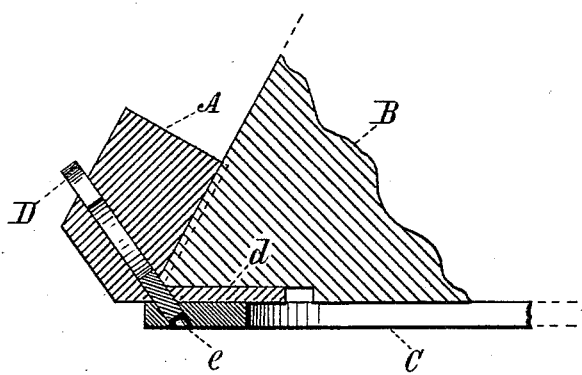

Figure 1 is a side elevation of a portion of a horse's hoof having one of my toe-weights secured thereto. Fig. 2 is a plan view of the same. Fig. 3 is a transverse sectional view of the weight, taken in the line $x\ x$, Fig. 1; and Fig. 4 is a side sectional view taken through the middle of the weight and forward lower part of the hoof.

Referring to the drawings, A represents the body of the weight; B, the fore part of the horse's hoof; D, a spring fastening-cotter. S, Fig. 2, is a cotter-way in the lower part of the body of the weight.

To prepare the hoof for the reception of the weight, a channel is cut in the bottom thereof for the admission of the tongue $d$, so that the latter will fit snugly between the shoe and the hoof, as shown in dotted lines in Fig. 1. The tongue $d$, it will be observed, though shown as made integral with the weight, is not necessarily so. The part of the weight which rests against the hoof is made concave, as shown at $o$, Fig. 2, so as to prevent lateral vibration.

To securely retain the weight in the position shown, and also admit of its ready removal, a spring-cotter D, of the construction and form shown in Fig. 3, is inserted in the cotter-way S. It will be noticed that the lower part of this cotter passes through a hole in the tongue $d$ into a corresponding hole in the shoe C, as shown in dotted lines in Fig. 1. The upper part of the fastening-cotter, as will be seen by reference to Fig. 3, is formed of two diverging springs $r\ r$, provided with shoulders $p\ p$, adapted, when the cotter is inserted as shown, to butt against the stops $a\ a$ in the upper part of the sides of the cotter-way. The hoof being provided with the necessary channel for the reception of the tongue $d$ and the latter inserted therein, the cotter is pushed into the opening S by holding it between the thumb and forefinger and pressing the two springs together. The cotter being inserted to the required distance—that is, until the lower end reaches nearly through the shoe, as shown in Fig. 1—the springs $r\ r$ are then released, and consequently instantly fly apart, bringing the shoulders $p\ p$ under the stops $a\ a$ and firmly locking the cotter in position, and consequently securing the toe-weight against the possibility of accidental removal.

To remove the toe-weight from the foot of the horse, the springs $r\ r$ are brought together between the thumb and forefinger, as indicated by the arrows in Fig. 2. The cotter may then be removed and the weight withdrawn from the hoof, as indicated by the arrow in Fig. 1.

Having fully described my invention, what I claim, and desire to secure by Letters Patent, is—

A toe-weight for horses, consisting of a metallic block A, having a concave back adapted to rest upon the lower front part of the hoof, so as to prevent lateral sway of the upper part of the weight and provided with a cotter-way S for the reception of a spring-cotter D and also a tongue or stem $d$, the latter adapted for insertion in a channel formed in the bottom of the hoof, so that the weight will rest on the front of the hoof and also on the shoe and be secured in this position by a spring-cotter or fastening-pin D, the lower end of the latter adapted to pass into and snugly fit a hole $e$ in the forward part of the shoe, the upper part of said fastening-cotter being bifurcated, so as to form two springs, each of the latter provided with a shoulder $p$, adapted when the cotter is fully inserted to butt against a stop or flange $a$ in the upper part of the cotter-way, all of said parts constructed, combined, and adapted to each other, substantially in the manner and for the purpose herein set forth.

In testimony that I claim the foregoing I have hereunto set my hand this 25th day of February, 1891.

HARRY ARMSTRONG.

Witnesses:
W. H. MILLER,
D. E. BEATY.